(12) United States Patent
Yamaguchi

(10) Patent No.: US 8,452,262 B2
(45) Date of Patent: May 28, 2013

(54) TERMINAL DEVICE

(75) Inventor: Kenji Yamaguchi, Daito (JP)

(73) Assignee: Kyocera Corporation, Kyoto (JP)

( * ) Notice: Subject to any disclaimer, the term of this patent is extended or adjusted under 35 U.S.C. 154(b) by 773 days.

(21) Appl. No.: 10/562,912

(22) PCT Filed: Jun. 30, 2004

(86) PCT No.: PCT/JP2004/009573
§ 371 (c)(1),
(2), (4) Date: Dec. 7, 2006

(87) PCT Pub. No.: WO2005/003978
PCT Pub. Date: Jan. 13, 2005

(65) Prior Publication Data
US 2007/0073812 A1 Mar. 29, 2007

(30) Foreign Application Priority Data
Jul. 2, 2003 (JP) ................................. 2003-190602

(51) Int. Cl.
*H04L 12/58* (2006.01)
*H04M 1/725* (2006.01)

(52) U.S. Cl.
USPC ........ 455/412.1; 455/420; 455/466; 709/246; 709/206

(58) Field of Classification Search
USPC ............ 455/412, 466, 503, 412.1, 420, 412.2
See application file for complete search history.

(56) References Cited

U.S. PATENT DOCUMENTS

| 6,085,084 | A | * | 7/2000 | Christmas | 455/411 |
| 6,519,241 | B1 | * | 2/2003 | Theimer | 370/338 |
| 6,697,942 | B1 | * | 2/2004 | L'Heureux et al. | 713/152 |
| 6,741,855 | B1 | * | 5/2004 | Martin et al. | 455/419 |
| 6,757,530 | B2 | * | 6/2004 | Rouse et al. | 455/412.1 |
| 2002/0147661 | A1 | * | 10/2002 | Hatakama et al. | 705/26 |
| 2003/0147095 | A1 | * | 8/2003 | Karn | 358/1.15 |
| 2003/0158855 | A1 | * | 8/2003 | Farnham et al. | 707/102 |
| 2003/0224760 | A1 | * | 12/2003 | Day | 455/412.1 |

FOREIGN PATENT DOCUMENTS

| EP | 0 881 587 A2 | 12/1998 |
| EP | 881587 A2 * | 12/1998 |
| JP | 10-307826 | 11/1998 |
| JP | 10-334004 | 12/1998 |

(Continued)

OTHER PUBLICATIONS

Japan Office Action corresponding to Japan Appln No. 2002-190602 dated Feb. 19, 2008.

*Primary Examiner* — Vladimir Magloire
(74) *Attorney, Agent, or Firm* — Duane Morris LLP

(57) ABSTRACT

The present invention is a terminal device for transmitting and receiving mails, comprising: a mail receiving unit; a judging unit operable to judge whether a command declaration is included in a received mail; a command interpreting unit operable to extract and interpret a specific command following the command-declaration if the judgment of the judging unit is affirmative; a creating unit operable to create, if the specific command is interpreted as target list creation, a list of corresponding targets in memory of the terminal device; and a mail transmitting unit operable to create and transmit a mail having the created list as a mail main body and addressed to a requester.

17 Claims, 13 Drawing Sheets

FOREIGN PATENT DOCUMENTS

| | | | |
|---|---|---|---|
| JP | 11-282775 | * | 10/1999 |
| JP | 2000-59867 | | 2/2000 |
| JP | 2000-341425 | | 12/2000 |
| JP | 2002-33822 | | 1/2002 |
| JP | 2002-57750 | | 2/2002 |
| JP | 2002-232557 | | 8/2002 |
| JP | 2002-251273 | | 9/2002 |
| JP | 2003-143232 | | 5/2003 |

* cited by examiner

FIG.3

INCOMING MAILS

|   | UNREAD/READ | SENDER | RECEIVED DATE | SUBJECT |
|---|---|---|---|---|
| 1 | UNREAD | Ms. AAA | 2003.05/20 | THANK YOU |
| 2 | UNREAD | Mr. BBB | 2003.05/19 | IMPORTANT TERMS & CONDITIONS |
| 3 | READ | Ms. AAA | 2003.05/19 | PLAN FOR JUNE 10 |
| 4 | UNREAD | Mr.&Mrs. CCC | 2003.05/18 | GO SEE A MOVIE! |
|   | ⋮ | ⋮ | ⋮ | ⋮ |
| 30 | READ | Dr. DDD | 2003.04/28 | DINNER PARTY |

SCHEDULES

| | DATE | TIME | ICON |
|---|---|---|---|
| 1 | 2003.05/21 | 8 : 00 |  |
| 2 | 2003.05/22 | 19 : 00 |  |
| 3 | 2003.05/23 | 9 : 00 |  |
| 4 | 2003.05/23 | 14 : 00 |  |
| ⋮ | ⋮ | ⋮ | ⋮ |
| 30 | 2003.06/20 | 10 : 00 |  |

FIG.5

IMAGES

| | SHOOTING DATE | TITLE | ADDRESS |
|---|---|---|---|
| 1 | 2003.05/18 | DOG | USER FOLDER 1   001/001 |
| 2 | 2003.05/18 | FLOWERS | USER FOLDER 2   001/002 |
| 3 | 2003.05/17 | WOMEN | USER FOLDER 2   002/002 |
| 4 | 2003.05/17 | GOLF | SHOT FOLDER    001/110 |
| ⋮ | ⋮ | ⋮ | ⋮ |
| 30 | 2003.04/8 | CHERRY BLOSSOM | SHOT FOLDER    027/110 |

TERMINAL DEVICE

TECHNICAL FIELD

The present invention relates to a terminal device, such as a mobile phone, and in particular to a terminal device from which information can be retrieved by remote control.

BACKGROUND ART

There is conventionally known a mobile phone so designed that, even if the user has gone out, leaving the mobile phone at home, he is able to transfer and check unread mails and messages recorded on the phone by remote control from where he is (e.g. Patent Reference 1).

[Patent Reference 1] Japanese Laid-Open Patent Application Publication No. 2002-232557 (column 7, paragraphs 0038 and 0039; and FIG. 2)

However, with the conventional mobile phones of this type, users can only transfer messages and unread mails by remote control in order to check them. Therefore, these mobile phones are inconvenient in the following situation. Assume that a user has, for example, two mobile phones, and he has gone out carrying one (for private use) of them while leaving the other (for business use) at home. It is sometimes the case that mobile phones for business use receive a lot of mails. In such cases, even if the user transfers, to the first mobile phone, unread mails received by the second mobile phone by remote control, using the first mobile phone at the place where he is, he cannot check the contents of mails efficiently when there are a great number of incoming mails. Thus, the above conventional mobile phones have a problem that needs to be addressed.

DISCLOSURE OF THE INVENTION

The present invention has been made to solve the above stated problem, and aims at offering a terminal device enabling the user to check incoming mails and schedules efficiently.

In order to solve the above problem, the present invention is a terminal device for transmitting and receiving mails, comprising: a mail receiving unit; a judging unit operable to judge whether a command declaration is included in a received mail; a command interpreting unit operable to extract and interpret a specific command following the command declaration if the judgment of the judging unit is affirmative; a creating unit operable to create, if the specific command is interpreted as target list creation, a list of corresponding targets in memory of the terminal device; and a mail transmitting unit operable to create and transmit a mail having the created list as a mail main body and addressed to a requestor.

The terminal device of the present invention may further comprise: a comparing unit operable to detect, if a password accompanies the command declaration and the judgment of the judging unit is affirmative, the password, and compare the password with a password owned by the terminal device; and an authorizing unit operable to authorize the extraction and interpretation of the specific command if the passwords match each other.

As to the terminal device of the present invention, the command declaration may be a unique character string different from a mail text, and here the specific command is a line of code including a storage location of the targets, a type of the targets, and a process to be performed.

As to the terminal device of the present invention, if a specific command transmitted by the requester after the requester checks the list of the mail is a request of transmitting a specific item in the list, the specific item may be read from the memory, and here a mail having the read specific item as a mail main body and addressed to the requestor is created and transmitted.

As to the terminal device of the present invention, if a specific command transmitted by the requester after the requester checks the list of the mail is a request of deleting a specific item in the list, the specific item may be deleted from the memory.

As to the terminal device of the present invention, a mail having a main body which indicates completion of the deletion and addressed to the requester may be created and transmitted.

According to the present invention, the user is able to request, using a terminal at the place where he is, a terminal device at home to create a list of incoming mails or the like, for example, and roughly check a large number of incoming mails by receiving the list. In addition, detailed contents of a specific incoming mail can be retrieved if needed, which allows the user to check incoming mails efficiently even from a remote place. Furthermore, it is possible to delete a specific incoming mail from a remote place.

BRIEF DESCRIPTION OF THE DRAWINGS

FIG. 3 shows an incoming mail list of the terminal device of the preferred embodiment of the present invention;

FIG. 5 shows an image list of the terminal device of the preferred embodiment of the present invention;

BEST MODE FOR CARRYING OUT THE INVENTION

Next is described a preferred embodiment of the present invention with the aid of drawings.

Figure 1:
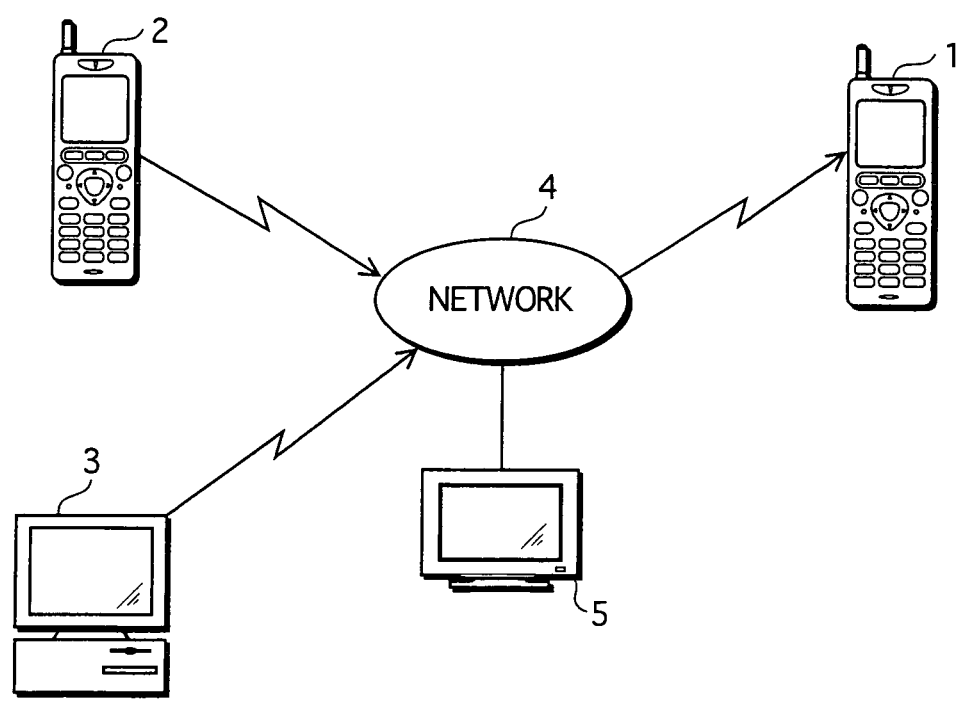
FIG. 1 shows a schematic system diagram used to describe a terminal device of the present invention.

In FIG. 1, reference numeral 1 shows a mobile phone left at home; reference numeral 2 shows a mobile phone carried by the user; reference numeral 3 shows a PC (personal computer) set up at, for example, an office; reference numeral 4 shows a network; and reference numeral 5 shows a mail server in which accounts for these mobile phones 1 and 2 and the PC 3 have been created.

In the case where the mobile phone 1 is being used for, for instance, business purposes, it is sometimes the case that a great number of mails are sent to the mobile phone 1 from outside. In the present invention, to check these mails by remote control from outside, a signal comprising a command declaration, an authentication password, and a succeeding specific command is sent to the mobile phone 1 from the outside mobile phone 2 or PC 3. The command declaration is a unique character string different from mail texts, and the specific command is a line of code including a storage location of a target, a type of the target, and a process to be performed. Note that the character string of the command declaration includes, in addition to texts, mere symbols such as an asterisk.

The signal is received by the mobile phone 1. Based on the received signal, the mobile phone 1 then edits a predetermined number of mails (e.g. thirty mails) selected, in order of most recently received, from the above-mentioned great number of incoming mails and creates a list of them. Subsequently, the mobile phone 1 transmits the list to the mobile phone 2 or the PC 3. The mobile phone 2 or PC 3 checks the transmitted list, and again sends back a predetermined signal to the mobile phone 1 so as to obtain necessary information. The mobile phone 1 transfers a requested mail to the mobile phone 2 or PC 3 based on the received signal.

Thus, it is possible to efficiently retrieve necessary information from outside. Besides incoming mails, schedules of the user and images—such as previously taken photographs and photographs received from others—stored in the mobile phone 1 can also be the target.

Figure 4:
FIG. 4 shows a schedule list of the terminal device of the preferred embodiment of the present invention.
Figure 4:
Figure 4:
Figure 4:
Figure 4:

FIGS. 3, 4 and 5 illustrate examples of the above list. That is, FIG. 3 shows a list of thirty incoming mails, for each of which information is provided in columns labeled "UNREAD/READ", "SENDER", "RECEIVED DATE" and "SUBJECT". As a matter of course, the list may only include "UNREAD" mails. FIG. 4 shows a list of schedules of thirty events with information regarding "DATE", "TIME" and "ICON". The column "ICON" includes pictures, each of which represents a type of the event. FIG. 5 is a list of thirty images with information regarding "SHOOTING DATE", "TITLE" and "ADDRESS". Images that the user previously took are stored in a shot folder, while images sent from outside are stored in a user folder. Note here that "SHOOTING DATE" for each image sent from outside represents a date on which the image was stored in the mobile phone 1.

Figure 6:
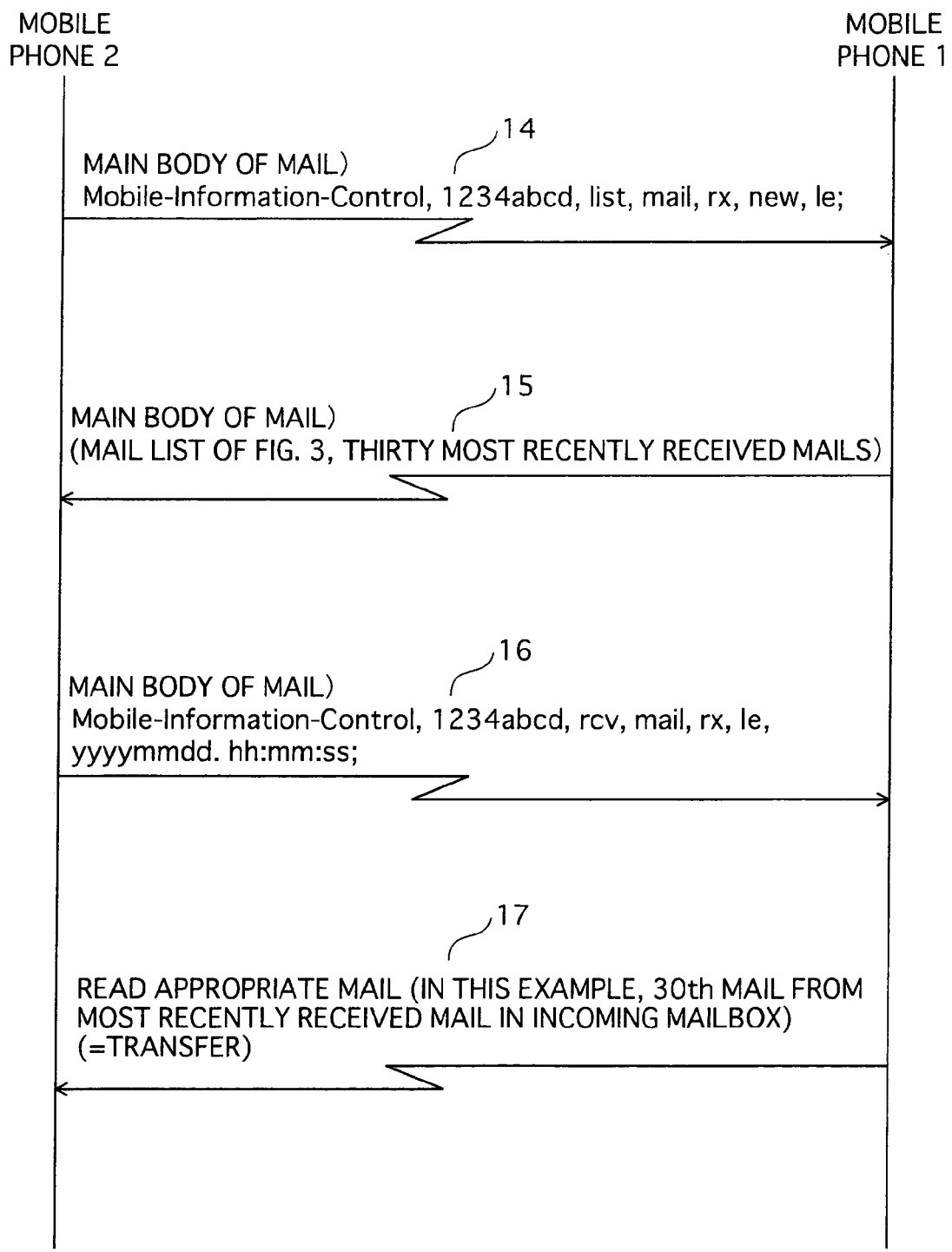
FIG. 6 shows a sequence chart for retrieving an incoming mail using the terminal device of the preferred embodiment of the present invention.

FIG. 6 shows a sequence chart for retrieving an incoming mail and illustrates mail exchanges between the mobile phones 1 and 2. A signal 14 that the mobile phone 2 sends to the mobile phone 1 at the start consists of a command declaration, an authentication password, and a succeeding specific command, as described above. In the case shown in FIG. 6, the command declaration is "Mobile-Information-Control"; the password is "1234abcde"; and the specific command is "list,mail,rx,new,le;".

In the specific command, "list" is information directing the mobile phone 1 to create and send a list; "mail" indicates incoming mails; "rx" means a box in which the incoming mails are stored; "new" denotes the most recent ones; and "le" means the 30th. Namely, the specific command is a line of code, as a whole, requesting the mobile phone 1 to make a list by selecting the thirty most recently received incoming mails from mails in the incoming mailbox and send the list.

The mobile phone 1 creates the list shown in FIG. 3, and transmits this to the mobile phone 2 (a signal 15 in FIG. 6). Next, the user takes a look at the received list, and requests, using the mobile phone 2, the mobile phone 1 to transmit a specific mail. A signal 16 in FIG. 6 is an example of a signal for such a request. While the command declaration "Mobile-Information-Control" and the password "1234abcde" are the same as those in the signal 14, the specific command is "rcv,mail,rx,le,yyyymmdd.hh:mm:ss;", which means to send the 30th mail.

After receiving the signal 16, the mobile phone 1 reads the 30th mail and transfers this to the mobile phone 2 (a signal 17 in FIG. 6). When the user requests a deletion of a specific mail, the mobile phone 2 may send a request signal of, for example, "Mobile-Information-Control,1234abcde,del,mail,rx,3,yyyymmdd.hh:mm:ss;", which indicates a request of deleting the third mail in the list.

Figure 7:
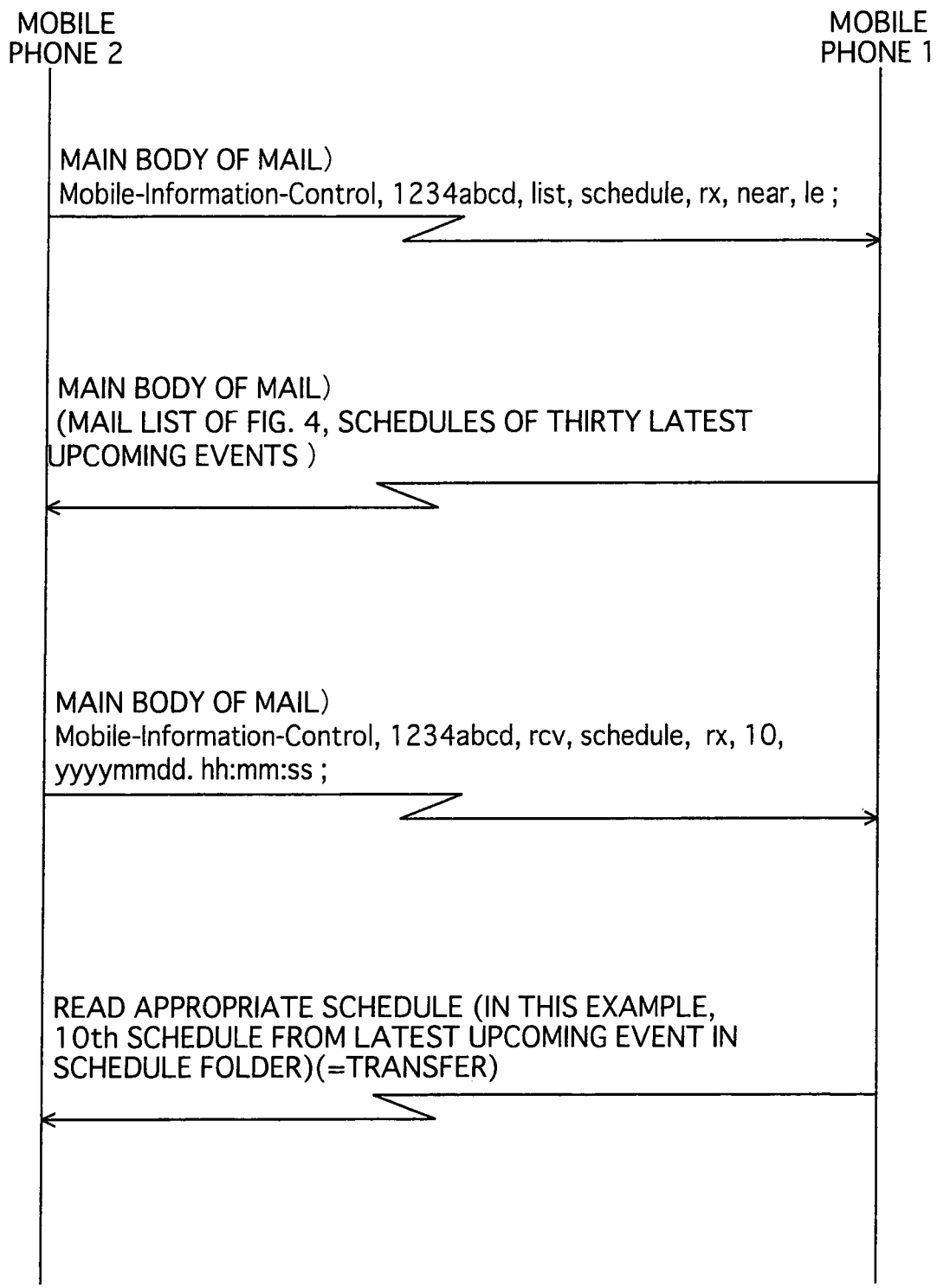
FIG. 7 shows a sequence chart for retrieving a schedule using the terminal device of the preferred embodiment of the present invention.

FIG. 7 shows a sequence chart of the case where a schedule stored in the mobile phone 1 being the target. The sequence chart illustrates an example in which: the mobile phone 2 requests the mobile phone 1 to create the schedule list shown in FIG. 4 (schedules of the thirty latest upcoming events); the mobile phone 1 transmits the list to the mobile phone 2; and the mobile phone 2 then requests to the mobile phone 1 to send the schedule of the 10th event in the list that the mobile phone 2 has received.

Figure 8:
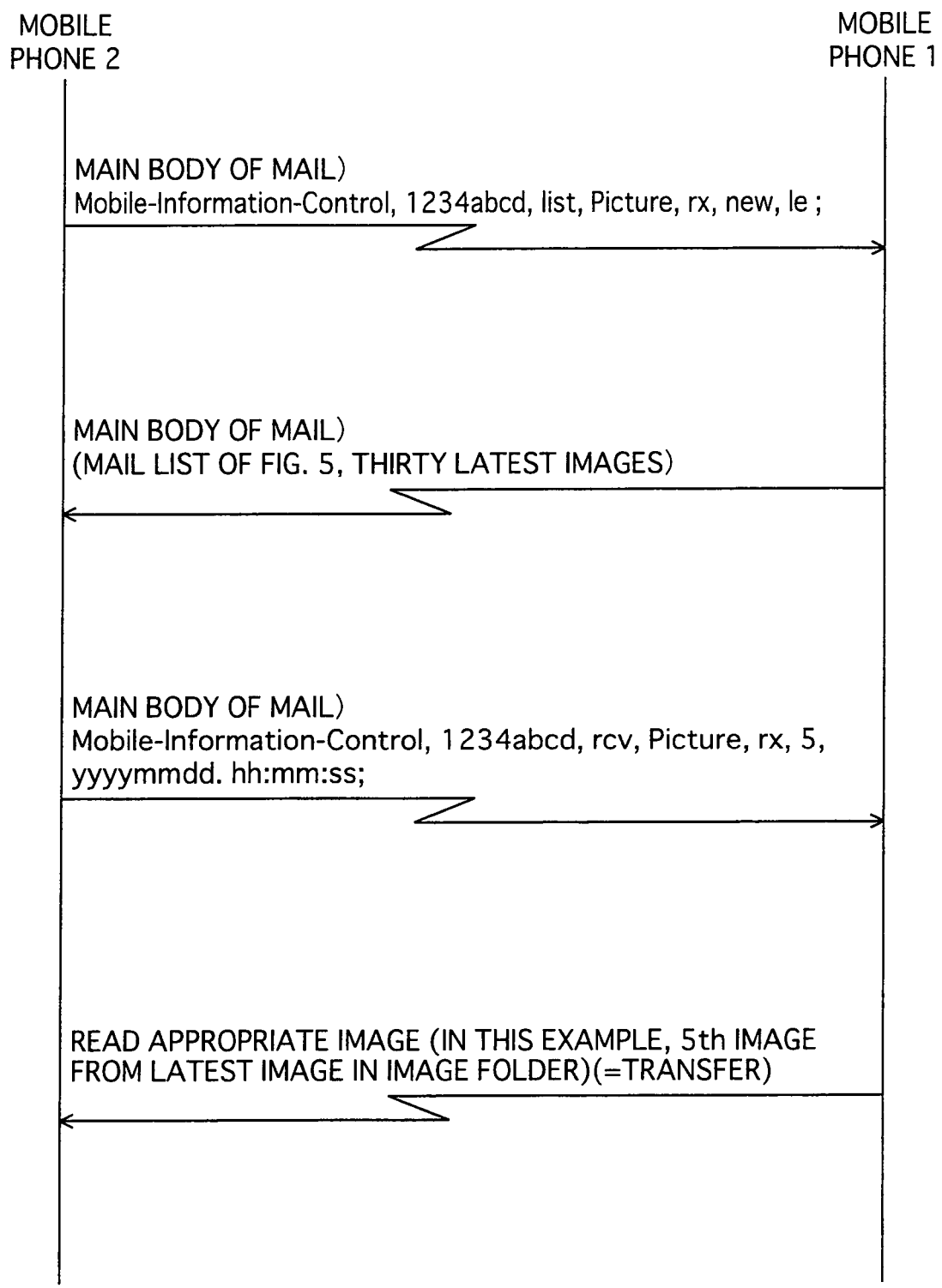
FIG. 8 shows a sequence chart for retrieving an image using the terminal device of the preferred embodiment of the present invention.

FIG. 8 shows a sequence chart of the case where an image stored in the mobile phone 1 being the target. The sequence chart illustrates an example in which: the mobile phone 2 requests the mobile phone 1 to create the image list shown in FIG. 5 (the thirty latest images); the mobile phone 1 transmits the list to the mobile phone 2; and the mobile phone 2 then requests to the mobile phone 1 to send the 5th image in the list that the mobile phone 2 has received.

Figure 2:
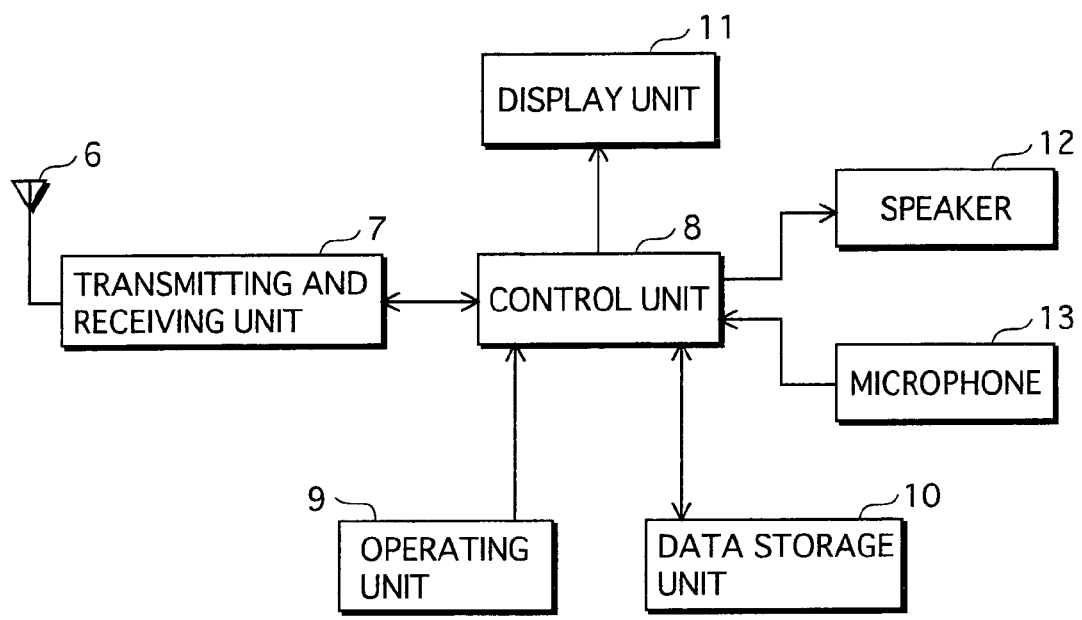
FIG. 2 shows a block diagram of the terminal device of a preferred embodiment of the present invention.

FIG. 2 shows a block diagram of the mobile phone (i.e. terminal device) according to the preferred embodiment of the present invention. The mobile phone comprises: a transmitting and receiving antenna 6; a transmitting and receiving unit 7 for transmitting and receiving signals; a control unit 8 for controlling the entire operation of the mobile phone; an operating unit 9 where the user performs a key input operation; a data storage unit 10 for storing data; a display unit 11 for displaying data; a speaker 12; and a microphone 13, as shown in FIG. 2.

The transmitting and receiving unit 7 includes: a mail receiving subunit for receiving mails; and a mail transmitting subunit for transmitting mails. The data storage unit 10 has therein processing programs for processing the control unit 8, a mailbox storing incoming and transmitted mails therein, a schedule folder in which the user's plans are written, and an image folder storing therein images such as photographs. The processing programs include a processing program unique to the present invention.

Next, processes of the device shown in FIG. 2—especially, processes of the control unit 8—is described with the aid of FIGS. 9 to 13, using the cases shown in FIGS. 6 to 8 as examples.

Figure 9:
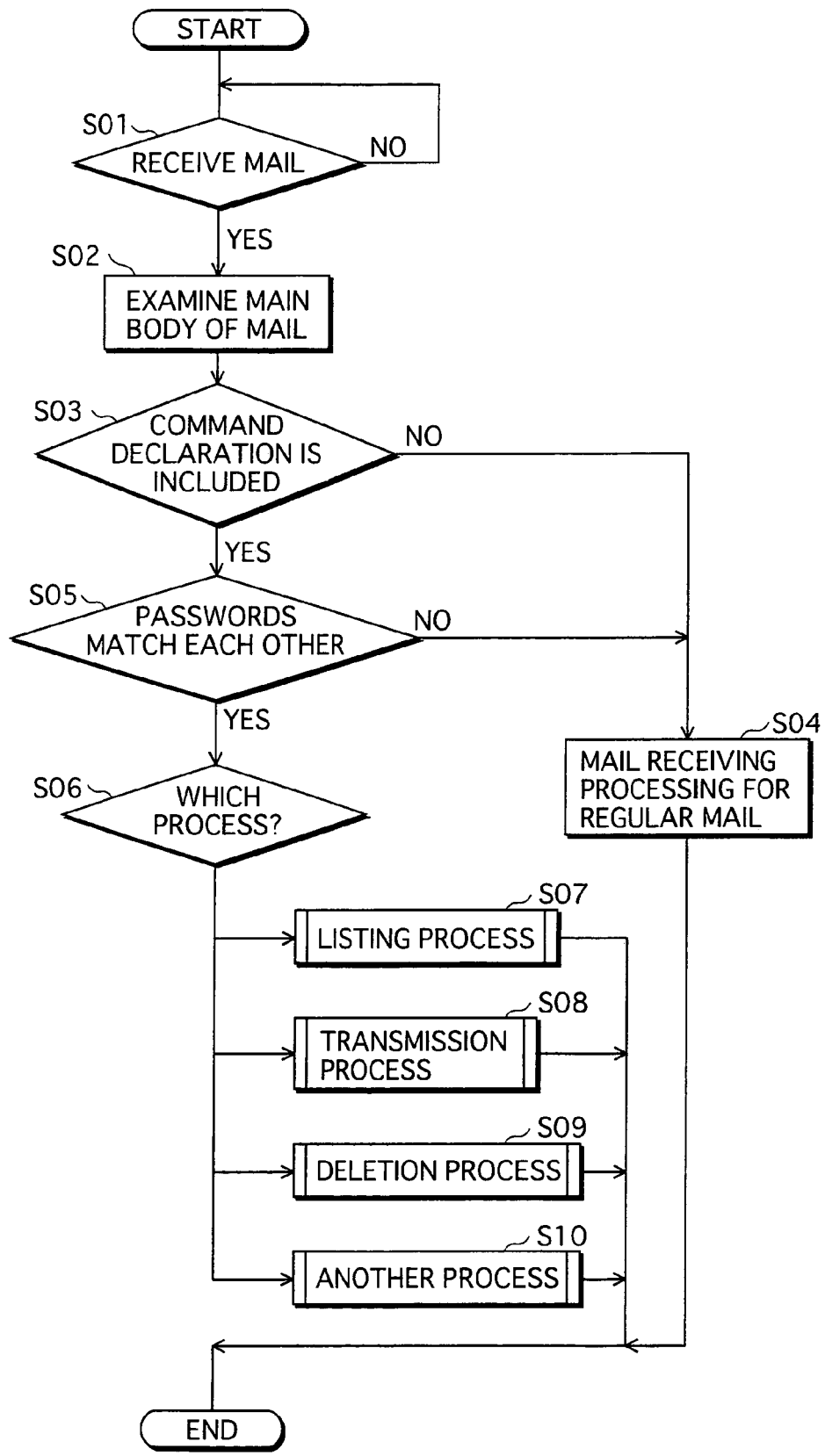
FIG. 9 shows a flowchart used to describe processes of the terminal device of the preferred embodiment of the present invention.
Figure 10:
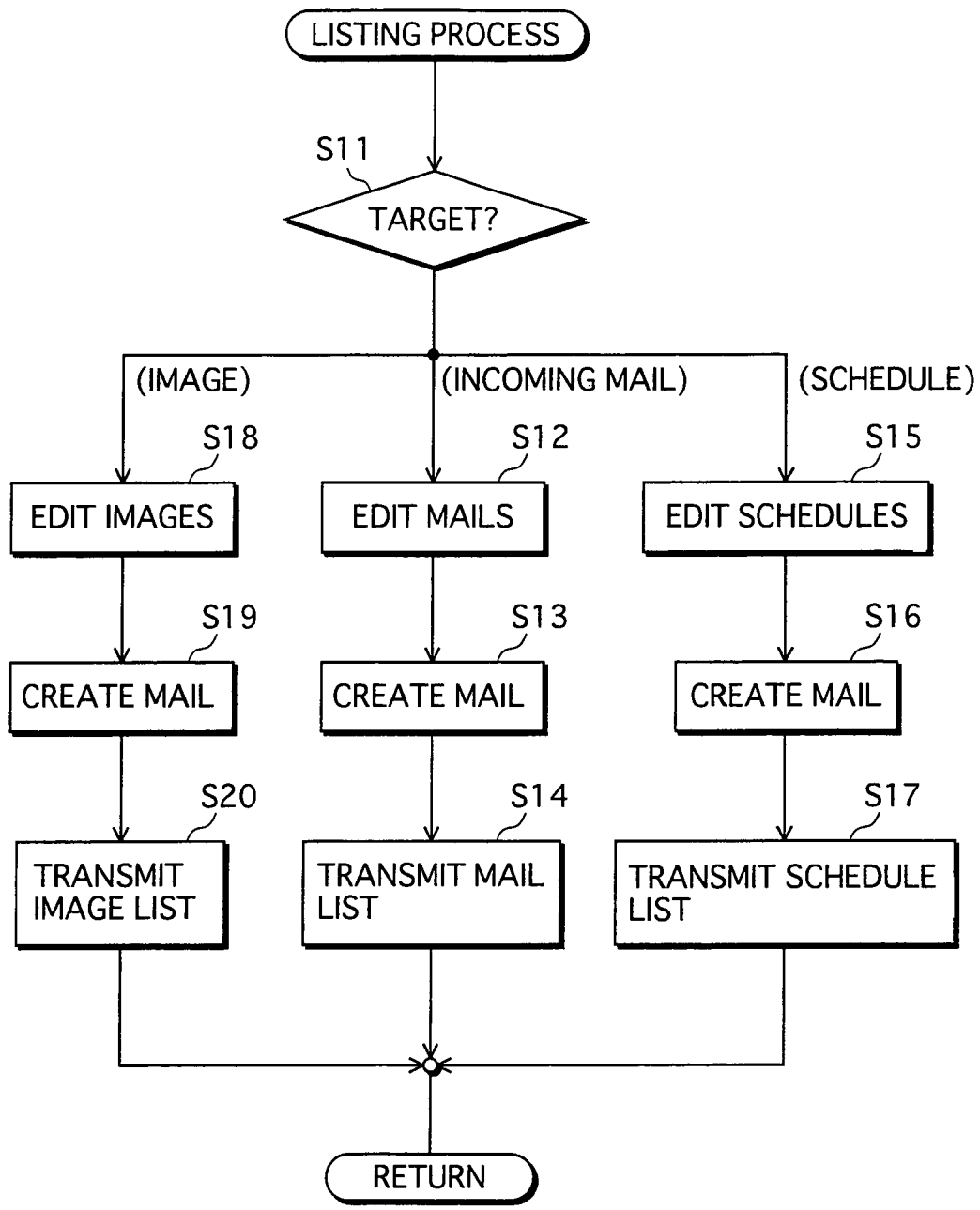
FIG. 10 shows a flowchart used to describe a listing process of the terminal device of the preferred embodiment of the present invention.

First, as shown in FIG. 9, the mobile phone 1 judges whether to have received a mail (S01). The mobile phone 1 remains in standby mode if having not received any mail, while moving to the next step when receiving a mail. When the mobile phone receives a mail, the mail text is examined (S02) to check whether a command declaration is included therein (S03). If no command declaration is included, the mail is processed as a regular mail (S04). When a command declaration is included, a password in the mail is judged whether to match the password of the mobile phone 1 (S05). If the passwords do not match each other, the mail is processed as a regular mail (S04). When these passwords match each other, a processing operation of request is determined in the next step (S06).

The processing operation is one of the following: a listing process step (S07); a transmission process step (S08); a deletion process step (S09); and another process step (S10). When the processing operation is the listing process (S07), what is the target is checked in Step S11 of FIG. 10. In the case where the target is incoming mails, incoming mails are taken from the incoming mailbox in the data storage unit 10, and the thirty most recently received incoming mails are edited according to the request to create the incoming mail list shown in FIG. 3 (S12). Then, the incoming mail list is set as a main body of mail, and a mail addressed to the requester is created (S13). The created mail is transmitted through the transmitting and receiving unit 7 and antenna 6 to the mobile phone 2, via the network 4 and mail server 5 (S14).

When the target is schedules, schedules are edited in Step S15 to create the schedule list of FIG. 4. Then, a mail is created in Step S16 and transmitted in Step S17. In the case where the target is images, the similar procedure takes place in Steps S18, S19 and S20.

On the side of the mobile phone 2, the user takes a look at a transmitted list, and places a request so as to obtain seemingly necessary data. In this case, although the procedure up to Step S06 is the same as above, the processing operation of request determined in Step S06 is the transmission process (which is indicated by, for example, "rcv" in the signal 16 of FIG. 6). Next is described the transmission process (S08).

Figure 11:
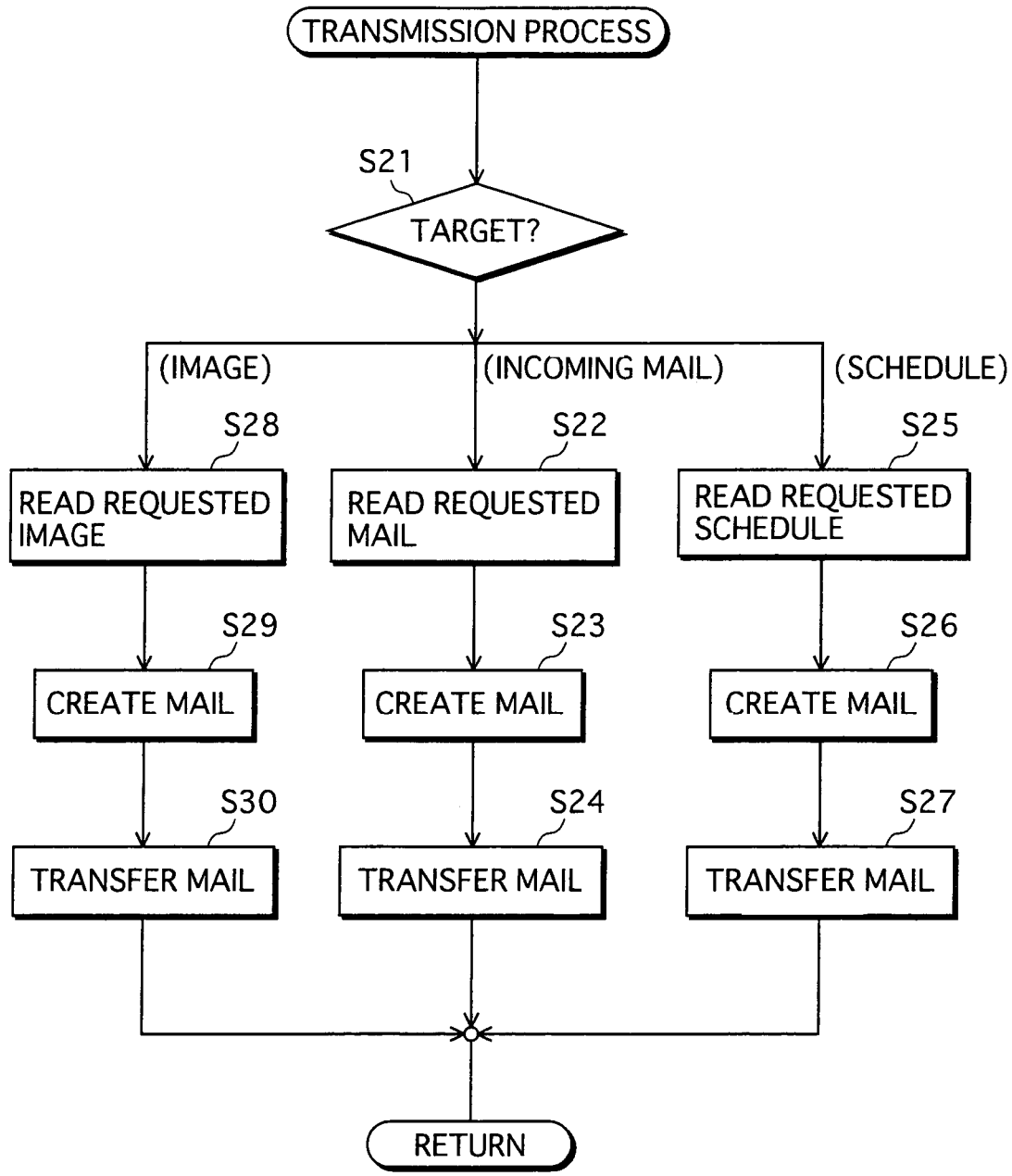
FIG. 11 shows a flowchart used to describe a transmission process of the terminal device of the preferred embodiment of the present invention.

As shown in FIG. 11, what is the target is determined in Step S21. In the case where the target is an incoming mail, a requested incoming mail (a specific one—e.g. the 30th incoming mail of the list, which is indicated by the signal 16 of FIG. 6) is read from the incoming mailbox of the data storage unit 10 (S22). Then, the read incoming mail is set as a main body of mail, and a mail addressed to the requester is created (S23). The created mail is transferred to the mobile phone 2 of the requester (S24).

In the case where the target is a schedule, a requested schedule (a specific schedule) is read from the schedule folder of the data storage unit 10 in a similar fashion (S25). Then, a mail is created (S26), which is subsequently transmitted to the mobile phone 2 of the requester (S27).

In the case where the target is an image, a requested image (a specific one) is read from the image folder of the data storage unit 10 in a similar fashion (S28). Then, a mail is created (S29), which is subsequently transferred to the requester (S30). Note that the image may be an attachment of the main body of the mail.

Figure 12:
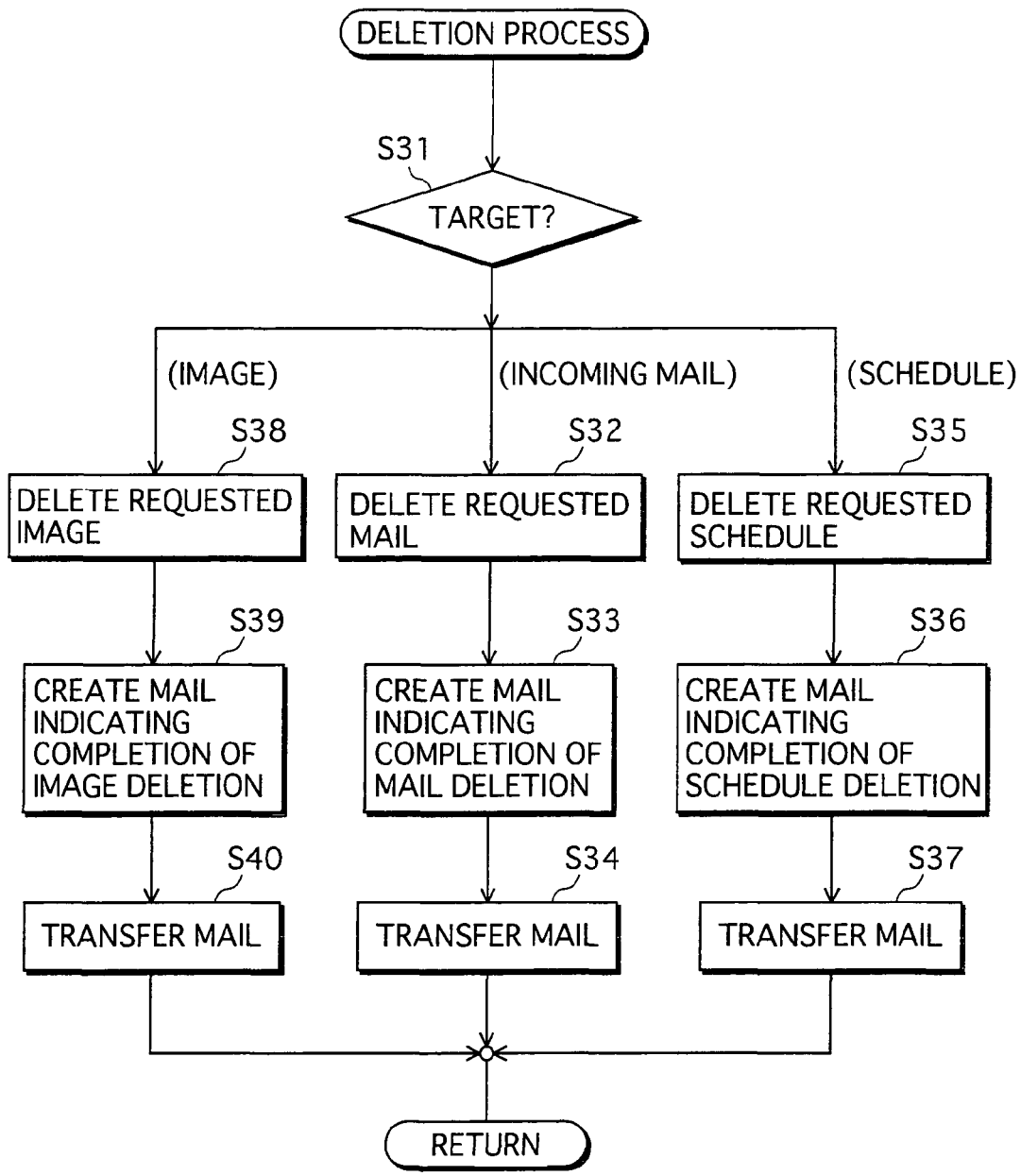
FIG. 12 shows a flowchart used to describe a deletion process of the terminal device of the preferred embodiment of the present invention.
Figure 13:
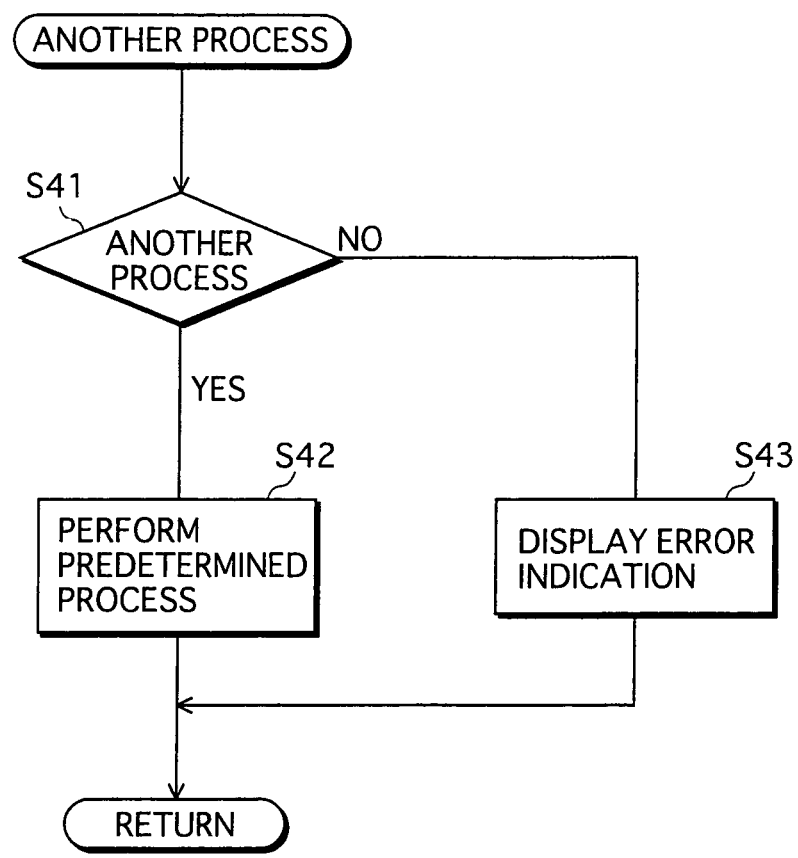
FIG. 13 shows a flowchart used to describe another process of the terminal device of the preferred embodiment of the present invention.

Next is described, with the aid of FIG. 12, the deletion process (S09), which is determined in Step S06 ("del" in the deletion request signal above indicates that the processing operation of request is the deletion process). As shown in FIG. 12, what is the target is determined in Step S31. In the case where the target is an incoming mail, an incoming mail which has been selected from the list and requested to delete (e.g. the third incoming mail—a specific one—in the list) is deleted from the incoming mailbox of the data storage unit 10 (S32). Then, information indicating the completion of the deletion process is set as a main body of mail, and a mail addressed to the requester is created (S33). The created mail is transferred to the mobile phone 2 of the requester (S34).

In the case where the target is a schedule, a requested schedule (a specific one) is deleted from the schedule folder of the data storage unit 10 in a similar fashion (S35). Then, a mail indicating the completion of the deletion is created (S36), which is subsequently transmitted to the mobile phone 2 of the requester (S37).

In the case where the target is an image, a requested image is deleted from the image folder of the data storage unit 10 in a similar fashion (S38). Then, a mail indicating the completion of the deletion is created (S39), which is subsequently transferred to the requester (S40).

In the case where the processing operation of request is determined in Step S06 is another process (S10), whether or not there is another process is judged in Step S41. If YES, a predefined process is performed in Step S42. If NO, an error indication is presented on a display screen of the mobile phone 1.

In the above-preferred embodiment, incoming mails, schedules, and images are used as examples of the target, however, the present invention is not limited to these. Transmitted mails, an address book, received voice calls, transmitted voice calls, positional information, or the like can also be the target of the present invention.

Additionally, although the above preferred embodiment is described using an example of exchanges between two mobile phones, one may be a PC or another type of terminal device, or alternatively, both may be PCs or another type of terminal devices.

In the case of using the above mobile phone 2, command declarations, a password, and specific commands are stored in advance, and used according to need. However, if a PC at an office is used instead of the mobile phone 2, it is required to input a command declaration, a password, and a specific command each time. In order to eliminate such inconvenience, command declarations, a password and specific commands may be stored in a memory card or another portable memory device in advance, and used according to need by causing the PC to read these.

As has been described, the present invention is a terminal device for transmitting and receiving mails, comprising: a mail receiving unit; a judging unit operable to judge whether a command declaration is included in a received mail; a command interpreting unit operable to extract and interpret a specific command following the command declaration if the judgment of the judging unit is affirmative; a creating unit operable to create, if the specific command is interpreted as target list creation, a list of corresponding targets in memory of the terminal device; and a mail transmitting unit operable to create and transmit a mail having the created list as a mail main body and addressed to a requestor. Herewith, the user is able to request, using a terminal at the place where he is, a terminal device at home to create a list of incoming mails, for example, and roughly check a great number of incoming mails by receiving the list. Thus, the user can efficiently check incoming mails, for example.

In addition, the present invention is a terminal device characterized in that, if a specific command transmitted by the requester after the requester checks the list of the mail is a request of transmitting a specific item in the list, the specific item is read from the memory, and a mail having the read specific item as a mail main body and addressed to the requester is created and transmitted. Herewith, detailed contents of a specific incoming mail can be retrieved if needed, which allows the user efficiently obtain incoming mails from a remote place.

Furthermore, the present invention is a terminal device characterized in that, if a specific command transmitted by the requester after the requester checks the list of the mail is a request of deleting a specific item in the list, the specific item is deleted from the memory. Accordingly, it is possible to delete a specific incoming mail from a remote place.

Industrial Applicability

The terminal device of the present invention can be utilized as a mobile phone enabling the user to retrieve information therefrom by remote control.

The invention claimed is:

1. A terminal device for transmitting and receiving mails, comprising:
   a mail receiving unit;
   a judging unit to judge whether a command declaration is included in a mail transmitted by a requesting device to the terminal device;
   a command interpreting unit to extract and interpret a specific command following the command declaration if the judgment of the judging unit is affirmative;
   a creating unit to, if the specific command is interpreted as an instruction to create a list of information pieces pertaining to one or more targets, respectively, create the list of the information pieces from the targets stored in memory of the terminal device, the one or more targets each being specified by the specific command and being a mail intended to be received not by the requesting device but the terminal device;
   a mail transmitting unit to create and transmit a mail having the created list as a mail main body to the requesting device; and
   a processing unit to process the mail received by the terminal device as a regular mail if the judgment of the judging unit is negative.

2. The terminal device of claim 1, further comprising:
   a comparing unit to detect, if a password accompanies the command declaration and the judgment of the judging unit is affirmative, the password, and compare the password with a password owned by the terminal device; and
   an authorizing unit to authorize the extraction and interpretation of the specific command if the passwords match each other.

3. The terminal device of claim 1, wherein
   the command declaration is a unique character string different from a mail text, and
   the specific command is a line of code including a storage location of the targets, a type of the targets, and a process to be performed.

4. The terminal device of claim 3, wherein
   the targets further include transmitted mails, schedules of events, images, an address book, received voice calls, or transmitted voice calls.

5. The terminal device of claim 1, wherein
   if a specific command transmitted by the requesting device after the requesting device checks the list of the mail is a request to transmit a specific item in the list, the specific item is read from the memory, and a mail having the read specific item as a mail main body is created and transmitted to the requesting device by the mail transmitting unit.

6. The terminal device of claim 1, wherein
   if a specific command transmitted by the requesting device after the requesting device checks the list of the mail is a request to delete a specific item in the list, the specific item is deleted from the memory by the processing unit.

7. The terminal device of claim 6, wherein
   a mail having a main body which indicates completion of the deletion is created and transmitted to the requesting device by the mail transmitting unit.

8. The terminal device of claim 1, further comprising a display and wherein if the targets further include schedules of events, an icon indicating a type of an event are displayed in the list, with respect to each of the schedules of events.

9. The terminal device of claim 1, further comprising a display and wherein if the targets further include images, an address in which an image is stored are displayed in the list, with respect to each of the images.

10. The terminal device of claim 1, being a mobile phone.

11. The terminal device of claim 2, wherein
    the command declaration is a unique character string different from a mail text, and
    the specific command is a line of code including a storage location of the targets, a type of the targets, and a process to be performed.

12. The terminal device of claim 11, wherein:
    the targets further include transmitted mails, schedules of events, images, an address book, received voice calls, or transmitted voice calls.

13. The terminal device of claim 1, wherein
    the list of the one or more targets is created by selecting a predetermined number of the targets, in order of most recently received.

14. The terminal device of claim 1, wherein
    if the targets are the received mails, unread mails are included in the list and read mails are not included in the list.

15. The terminal device of claim 10, further comprising:
    a display unit to display data stored in the memory.

16. The terminal device of claim 1, wherein
    the number of the one or more targets in the list is a predetermined number that has been specified.

17. The terminal device of claim 1, wherein
    if the targets are received mails, at least a sender, a received date, and a subject are displayed in the list, with respect to each of the received mails.

* * * * *